United States Patent Office 2,887,395
Patented May 19, 1959

2,887,395
METHOD OF PREPARING PROTEIN

Stewart Rowe and Charles T. Nugent, Cincinnati, Ohio, assignors, by mesne assignments, to The Buckeye Cellulose Corporation, Cincinnati, Ohio, a corporation of Ohio No Drawing. Application January 10, 1955
Serial No. 481,033

1 Claim. (Cl. 106—154)

This invention relates to a method of producing a substantially unhydrolyzed soybean protein and has as its principal object the preparation of an unhydrolyzed protein characterized by improved adhesive strength in paper coating applications.

Extraction of proteins from protein-containing seed material by means of aqueous solutions of alkaline agents such as borax, soda ash, trisodium phosphate, sodium hydroxide and ammonium hydroxide is well known. Normally, substantially all the lipid material is first removed by expression or solvent extraction, to provide the raw material for this aqueous protein extraction. Depending upon the conditions, i.e. pH of the extracting medium, length of time the protein-containing material is in contact with the extracting medium and temperature at which the extraction is carried out, the extraction may or may not involve alkaline hydrolysis of the protein. For example, at a temperature of about 100° F. and a contact time of about 1 hour between the extracting medium and the protein-containing seed material, extraction at a pH of about 11 or higher will cause extensive hydrolysis to take place, while at a pH of about 9 or 10, little or no hydrolysis occurs. However, if the extraction is carried out at about 10 pH, substantial increase in the length of time in which the protein-containing material is in contact with the extraction medium, or an increase in the temperature at which the extraction is being carried out will tend to promote a hydrolysis reaction.

In none of the known processes, however, is the final product entirely suitable for use in all of the various fields in which protein is employed, and particularly in the field of paper coating. Thus, if the extraction involves alkaline hydrolysis, and yet the treatment is relatively mild, e.g. about 11 pH at 100–110° F. for about two hours, the resulting dried protein may be redissolved in weakly alkaline solutions to form a strong adhesive, but it is too viscous for many purposes (1000–5000 cps. and higher) and when employed for paper coating will not spread properly. If this treatment is more intense or severe, by reason of increase in either (1) temperature, (2) the strength of the alkali or (3) the duration of treatment, the viscosity may be improved but the adhesive strength is usually impaired and the yield is not as great. On the other hand, proteins produced without alkaline hydrolysis, although having the desired low viscosity for paper coating applications, have not exhibited the adhesive strength when dissolved in mild alkali (i.e. to give a dispersion pH between 8 and 10) which is characteristic of commercial alkali-hydrolyzed proteins. Consequently, low viscosity proteins heretofore produced in the absence of alkaline hydrolysis are not as desirable for many uses, and particularly where adhesive strength is needed, as are the alkali-hydrolyzed proteins.

It is an object of the present invention to produce a substantially unhydrolyzed soybean protein which has good adhesive strength.

It is a further object to produce such protein with solubility, color, and viscosity characteristics which make it eminently satisfactory for paper coating applications.

Other objects and advantages will be apparent from the following description.

We have found that a substantially unhydrolyzed protein having improved adhesive strength can be obtained by introducing during the isolation process a minor amount of an anionic surface active agent which contains from 6 to 22 carbon atoms and which possesses a polar anionic group containing sulfur in its highest state of oxidation. The carbon atoms in the surface-active agent may be arranged in aliphatic, aromatic or mixed aliphatic-aromatic structure and the presence of other atoms in the structure is not excluded, as is evident hereinafter. The protein so produced also has a ready solubility in mildly alkaline solution and color and viscosity characteristics satisfactory for paper coating applications.

The basic steps which are preferably used in the recovery of protein in accordance with our process are as follows. Substantially oil-free soybean flakes are slurried with an aqueous solution of a protein extracting medium of suitable strength known in the art (e.g. alkali metal hydroxides, carbonates or oxides, ammonium hydroxide, alkaline earth hydroxides, inorganic salts which give basic reactions in aqueous solutions such as sodium sulfite, neutral inorganic salts). The resultant slurry which may have a pH in the range from 6.3 to about 10.5 is heated to a temperature about 70° to 120° F. and the extraction is carried out with mild agitation for usually less than one hour. The first extract is separated from undissolved meal, usually by screening, and, if desired, may be centrifuged, for further clarification. To insure a better yield, the wet flakes from the first extraction may then be reslurried with additional water. The extract from this operation is usually again separated from the soybean flakes residue by screening and may, if desired, also be further clarified by centrifuging. The two extracts are then combined and the protein is precipitated from the combined solution. This is usually accomplished by the addition of an acid to bring the solution to the isoelectric point of the protein, although other methods such as dialysis or salting out, may be used. (It is generally accepted that these methods produce a mixture of proteins, and that the isoelectric point of protein may vary with the method used for extraction of the protein; therefore the isoelectric point may fall in the range from about 3.8 to about 4.8 pH.) The precipitated protein curd is then concentrated either by settling or by centrifuging; the concentrated curd is then optionally water-washed and is filtered at a pH in the isoelectric range where rapid filtration is obtained. The filtered curd is granulated and then dried and ground to prepare it for further use.

The temperature at which the extracted protein is dried may be varied over a relatively wide range although high temperatures are to be avoided because they tend to increase the amount of material remaining undissolved upon resolution of the protein in mild alkaline solutions. In any event, the maximum drying temperature is to be controlled so that the amount of material which does not dissolve on redispersion of the protein is not greatly increased over that of unheated protein.

The surface active agents which we have proposed as additives to promote an increase in the adhesive strength of the protein may be added at any point in the above described basic process prior to the actual drying of the protein. We prefer, however, to add the surface-active agent to the concentrated washed protein precipitate just prior to filtration, or to spray a solution of the surface-active agent onto the protein filter cake during the granulation operation where the filter cake is broken into smaller pieces to improve the drying rate. In any case, precautions must necessarily be taken to insure adequate mixing of the surface-active agent solution with the protein.

The surface-active agents which we have found to be operative for the purpose of our invention are anionic in nature and contain from 6 to 22 carbon atoms, which may be arranged in aliphatic, aromatic or aliphatic-aromatic structure, and a polar anionic group containing sulfur in its highest state of oxidation.

Examples of some of the classes of detergents and various commercially available detergents which fall into the above classification and which are effective for our purposes are:

| Detergent | Company | Composition [1] |
|---|---|---|
| Orvus WA | Procter & Gamble | Sodium lauryl alcohol sulfate. |
| Santomerse 1 | Monsanto Chemical Company. | Sodium dodecyl benzene sulfonate. |
| Santomerse 3 | do | Sodium dodecyl benzene sulfonate (purified). |
| Tergitol O 8 | Carbide & Carbon Chemical Co. | 40% solution of sodium sulfate of octyl alcohol. |
| Tergitol 4 | do | 25% solution of sodium tetradecyl sulfonate. |
| Tergitol 7 | do | 25% solution of sodium heptadecyl sulfonate containing some dichloro ethylether. |
| Teepol | Technical Products Ltd. (London, England). | Secondary alkyl sulfate of type $\begin{matrix} R \\ \diagdown \\ CHOSO_3Na \\ \diagup \\ R \end{matrix}$ |
| Igepon AP 78 | I. G. Farben Industrie. | Sodium stearyl sulfopropionate. |
| Igepon CN 42 | do | Sodium-N-cyclohexyl-N-palmitoyl taurate. |
| Aerosol OT | American Cyanamid Company. | Sodium dioctyl sulfosuccinate. |
| Surfax WO | E. F. Houghton Co | Sulfonated fatty acid ester. |
| Sorbit AC | Alrose Chemical Company. | Mono, dibutyl naphthalene sodium sulfonate. |
| Areskap-100 | Monsanto Chemical Company. | Monobutyl phenyl phenol sodium sulfonate. |
| Darvan 1 | R. T. Vanderbilt Co | Condensation product of formaldehyde with very pure naphthalene sulfonic acid. |
| Tamol N | Rohm & Haas | Sodium salt of a condensed sulfonic acid. |
| Ultrawet K | Atlantic Refining Company. | Sodium salt of a sulfonated petroleum hydrocarbon ($C_{16}$). |
| Ultrawet 60L | do | Alkyl benzene sulfonate of an organic salt. |
| Deceresol OT | American Cyanamid Company. | Sodium dioctyl sulfosuccinate. |
| Duponol WA (paste) | Du Pont | Technical sodium lauryl sulfate. |
| Alkanol DW | do | Sodium salt of an alkyl aryl sulfonate. |
| Arctic Syntex A | Colgate-Palmolive-Peet. | Sodium oleyl isethionate. |
| Arctic Syntex M | do | Ammonium salt of sulfonated monoglycerides of coconut oil fatty acids. |
| Ultrawet DS | Atlantic Refining Company. | Sodium alkyl benzene sulfonate. |
| Nacconol NR | National Aniline & Chem. Company. | Alkyl benzene sulfonate (alkyl group $C_{12}$ to $C_{18}$). |

[1] Compositions obtained from McCutcheon, Soap & Sanitary Chemicals, July, Aug., Sept. & October, 1952 and Sisley & Wood, Encyclopedia of Surface Active Agents.

Sodium p-chlorobenzene sulfonate
Fatty acid monoglyceride sulfonate
Sodium salt of alpha-sulfonated tallow fatty acid
Sodium salt of alpha-sulfonated tallow ethyl ester
Ammonium salt of alkyl benzene-ethylene oxide condensate sulfonate.

These agents are normally added during the isolation process in amounts from about 1% to about 4.5%, by weight of the protein present, based on the amount of active detergent ingredient. (This would be about 0.3% to about 1.35% by weight of the soybean flakes being extracted, assuming the usual average 30% yield by weight of protein from the flakes.) Amounts in excess of about 4.5% could be used but in some instances cause an excessive increase in the viscosity of the redispersed protein solution and are therefore, as a practical matter, not desirable. We normally prefer to add the surface active agents in an amount from about 1.0% to about 2.2% by weight of the protein present.

In all of the following examples, which are given by way of illustration only, the adhesive strength of the protein coating composition was determined by either one or both of the following methods.

*(a) Wax pick test—Method T459m–45, Wax Test for Surface Strength of Paper, of the Technical Association of the Pulp and Paper Industry*

The test is carried out using a set of standard paper testing waxes consisting of 20 waxes which have graded melting points. These waxes are numbered from 2, which has the lowest softening temp., to 32, which has the highest. In application the waxes are softened in a flame, placed upon the coated paper, cooled, and then pulled off sharply. Each wax bears a number and the strength of the coating adhesion may be designated by the highest numbered wax which fails to remove any coating. Thus, "np 4" means that the coating was not picked (np) by a number 4 wax, but was picked by a higher numbered wax. For intermediate values between two wax numbers, e.g. between a number 4 and a number 5 wax, the adhesive strength of the paper coating would normally be indicated as follows in increasing order.

np 4—Coating under wax was undisturbed (not picked)
cp 5—Coating under the wax completely picked
.9 p. 5 ⎫
.8 p. 5 ⎬ The approximate area, in $\frac{1}{10}$ increments, under
.1 p. 5 ⎭ the wax that was picked free of coating
np 5—Coating under wax was undisturbed (not picked)

In most of the examples herein we have found it convenient to express the coating strength as the increase in wax pick value over a blank.

*(b) Print test or ink pick test*

This test is designed to reproduce, in a controlled manner, the stresses to which a sheet of paper is subjected in actual use on a printing press.

The machine used is known as the Davidson-Pomper pick tester and consists of a cylinder on which strips of the paper to be tested are fastened, a rotating cylinder driven by a variable speed drive, and plates which are inked with a measured thickness of a standard ink and which are held at a constant temperature by a heated bed plate. The motor is set at the desired speed (the speed settings are linearly proportional to the surface speed of the drive cylinder) and an inked plate is pushed gently between the rotating cylinder and the paper cylinder. The drive cylinder drags the plate through the gap with the plate in turn dragging the paper cylinder around and printing a block on the sheet.

I.P.I. "tack graded inks" are used and the ink film thickness is kept to the desired setting within ±0.0005 inch.

The test room is maintained at 73° F. and 50% relative humidity and the paper sheets are conditioned in this atmosphere for 24 hours before testing. Failure of the sheet or coating is indicated by "picking" of the surface and is most easily detectable by examining the inked block after the test has been made.

Because of the difficulty in reproducing exact critical conditions, a blank is always run, and the results are reported as the increase in speed units over a blank run, for the highest speed at which no picking is observed.

*Example 1—Typical blank run.*—3.0 grams of sodium sulfite were added to 4200 ml. of water at 105° F. with agitation, and to the resultant solution 300 grams of substantially oil-free soybean flakes were added. After the flakes were thoroughly wet, 70 ml. of 2½% sodium hydroxide solution were added to the slurry to bring it to a pH of approximately 9.2. The slurry was maintained at a temperature of 105±2° F. and additional amounts of 2½% sodium hydroxide were added, 30 ml. after 10 minutes and another 15 ml. after 20 minutes. A final adjustment of the solution to a 9.2 pH was made after 28 minutes. Agitation was continued for a total of 30 minutes and the extraction slurry was then screened through a 100 mash U.S. standard screen.

A second extraction of the screened flakes was made by adding 1400 ml. of water to the flakes, agitating for five minutes at 105° F. and again screening the flakes from the extract.

The extracts from the two operations were then combined and the remaining solids centrifuged from the liquor. The protein was precipitated from the centrifuged extract by the addition of 7½% sulfuric acid solution to a pH of about 4.6. The precipitated protein curd was allowed to settle and two liters of supernatant liquor were decanted. An amount of water, at room temperature, equal to the amount decanted, was added to the curd, mixed well, and the curd again allowed to settle. The washing procedure was repeated and after the curd had settled, three liters of supernatant liquor from the third settling were decanted and the remaining slurry was then filtered through a Buchner funnel.

The filtered curd was shredded through a 6 mesh U.S. standard screen and dried in a circulating air oven at 145° F. for two hours.

The isolation procedure set forth above was used in all the following examples as the standard procedure, the only variation being in the addition of the anionic surface-active agent for improving the adhesive strength of the protein.

The protein produced by the above process was redissolved by slurrying in water and adding 3.5% sodium hydroxide based on the weight of the protein, to make a 15% solution of protein. This was added to a standard clay slip of such concentration that the final mixture contained 40% total solids, and 15% protein based on the weight of the clay. After thorough mixing, the resulting "coating color" was screened through a 100 mesh screen. The viscosity of the coating color was measured by a Brookfield viscometer at 60 r.p.m.

The optimum viscosity of the solution of redispersed protein will vary widely depending upon what it is to be used for and in the case of coating colors the viscosity will vary with the percentage of solids in the "color." With the normal 40% solids coating color, and employing conventional coating equipment, viscosities lower than about 500 centipoises are desirable.

The prepared coating color was coated on raw paper stock of 45# per ream weight (25" x 38"—500 sheets), designed for coating application, applying about 15 pounds of coating per ream per side. The coated paper was then tested in accordance with the hereinbefore described methods. When a "blank" is indicated, the results are those obtained with a paper coating composition using a protein isolated according to the above procedure but without the addition of the surface-active agent. Because of variations in the raw materials, a blank or control is made with each set of experimental runs to ensure correspondence of results.

*Example 2.*—The procedure of Example 1 was followed in preparing several samples of extracted protein except that various surface active agents in varying amounts, based on the protein, were added to the concentrated protein after washing but prior to filtration of the curd. Good mixing of the various agents with the protein was ensured by adding the agents in aqueous solution. Coating colors were then prepared from the thus prepared protein according to the aforedescribed method and the coating colors were applied to raw paper stock as hereinbefore noted. The adhesive strength is expressed in the table below as the increase over a blank run in terms of whole numbers with the wax pick test.

| Agent | Percent Added | Wax Test Increase over Blank |
|---|---|---|
| Santomerse #1 | 1.76 | +2 |
| Duponol WA Paste | 1.27 | +1 |
| Sodium p-chlorobenzene sulfonate | 4.4 | +2 |

The improved adhesive strength of paper coatings prepared from protein to which a surface-active agent has been added is apparent from the significant increase in the wax pick values over the blank.

*Example 3.*—Several samples of protein were prepared in accordance with the process of Example 2, except that some different surface active agents were used as additives. Coating colors were prepared from these protein samples and tested against a blank for viscosity and adhesive strength with the following results.

| Agent | Percent Added | Prote'n Solution Viscosity (cps.) | Coating Color Viscosity (cps.) | Wax Test Change | Print Test Change |
|---|---|---|---|---|---|
| None (Blank) | | 66 | 71 | | |
| Santomerse #3 | 2.2 | 178 | 241 | +1.2 | +6 |
| Decerosol OT | 2.2 | 370 | 234 | +1.2 | +15 |
| Duponol WA Paste | 1.1 | 156 | 130 | +1.2 | +15 |
| Tamol N | 2.2 | 114 | 126 | +1.2 | +6 |

Again, it may be seen from the above data that the addition of a surface-active agent in the process of preparing protein for application in paper coatings increases the adhesive strength of such paper coating. It is also to be noted that when using a protein so prepared, both the protein solution viscosity and the final coating color viscosity are at a desirably low level.

*Example 4.*—To the water used for extracting protein from soybean flakes, Santomerse 1 was added at a level of 3.3% of active agent, based on the weight of protein. The extraction, separation, precipitation and drying of the protein were carried out in the manner set forth in Example 1. A blank using no Santomerse was run parallel. When made up into paper coating colors and tested for adhesive strength, the following results were obtained:

| Agent | Wax Test | Print Test |
|---|---|---|
| Santomerse 1 | np 6 | np 21 (#2 ink). |
| Blank | np 5 | np 10 (#2 ink). |

*Example 5.*—The procedure of Example 1 was followed in preparing isolated protein and paper coating colors except that Orvus WA paste, in an amount about 1% by weight of the protein, was added at various points in the process. The results obtained are tabulated below on adhesive strength, in terms of a change over a blank run.

| Added to— | Wax Test Change | Print Test Change |
|---|---|---|
| Extraction slurry at 9 pH | 0 | +4 |
| Combined extracts before precipitation | +1 | +10 |
| Precipitated slurry before wash | 0 | +1 |
| Concentrated washed slurry before filtration | +1 | +5 |

*Example 6.*—The procedure of Example 4 was followed in preparing isolated protein and paper coating colors except that Igepon CN-42 in an amount 1.68% by weight of the protein was used as the added surface-active agent. The adhesive strength is expressed in the tabulation below as the increase over a blank run.

| Added to— | Wax Test Change | Print Test Change |
|---|---|---|
| Extraction slurry at 9 pH | +.6 | 0 |
| Combined extracts before precipitation | 0 | +3 |
| Precipitated slurry before wash | +.7 | +1 |
| Concentrated, washed slurry before filtration | 0 | +10 |

*Example 7.*—The procedure of Example 1 was followed in preparing several samples of extracted protein and paper coating colors except that various surface active agents in varying amounts, based on the weight of the protein, were added to the washed, concentrated protein curd before filtration with the following results.

| Agent | Percent Added | Wax Test Change | Print Test Change |
|---|---|---|---|
| Sodium p-chlorobenzene sulfonate | 3.7 | +1 | 0 |
| Tamol N | 3.4 | +1 | +1 |
| Teepol | 3.7 | +1 | +18 |
| Surfax W O | 3.7 | +0.7 | +13 |
| Ultrawet DS | 3.2 | +1.1 | 0 |
| Ultrawet K | 3.2 | +1.4 | +12 |
| Ultrawet 60L | 3.7 | +1 | +18 |
| Sorbit AC | 3.7 | +1 | +11 |
| Arctic Syntex A (powder) | 3.7 | +1 | 0 |
| Arctic Syntex M (beads) | 3.7 | +1 | 0 |
| Areskap 100 | 3.7 | +0.9 | +7 |
| Igepon AP-78 | 3.2 | +0.9 | 0 |
| Igepon CN-42 | 3.7 | +0.8 | +20 |
| Nacconol NR | 1.5 | +0.8 | +2 |
| Duponol WA Paste | 2.1 | 0 | +5 |

*Example 8.*—The process of Example 1 was followed in preparing samples of isolated protein except that various surface-active agents, in varying amounts by weight of the protein, were dissolved in water and sprayed on the granulated filter cake prior to drying. Coating colors were prepared from the various sprayed protein samples and were tested for adhesive strength according to the aforedescribed methods. The adhesive strength is expressed in the following tabulation of results as the change over a blank run.

| Agent | Percent Added | Print Test Change |
|---|---|---|
| Sodium alkyl ethylene oxide ether sulfate (alkyl derived from coconut oil fatty acids) | 3.3 | +3 |
| Ammonium alkyl benzene ethylene oxide ether sulfate (alkyl—9 carbon atom chain, 5 ethylene oxide group) | 3.3 | +4 |
| Monoglyceride sulfonate (alkyl derived from coconut oil fatty acids) | 3.3 | +2 |
| Na alpha-sulfonated tallow ethyl ester | 3.3 | +4 |
| Alkanol DW | 3.3 | +3 |
| Santomerse #3 | 1.67 | +2 |
| Na alpha sulfonate tallow FA | 3.3 | +3 |

| Agent | Percent Added | Wax Test Change | Print Test Change |
|---|---|---|---|
| Duponol WA Paste | 2.1 | +1.5 | +10 |
| Tamol N | 3.4 | 0 | +6 |
| Santomerse #3 | 1.9 | +1.2 | +6 |
| Aerosol OT | 1.9 | +1.2 | +16 |
| Duponol WA Paste | 1.1 | +1.2 | +15 |
| Tamol N | 1.9 | +1.2 | +6 |
| Santomerse #1 | 0.75 | +1, +1 | +7, +2 |
| Duponol WA paste | 1.1 | +1, +1 | +7, −3 |
| Tamol N | 1.9 | +0.6, +1 | +3, +2 |
| Tergitol 7 | 1.9 | +0.7, +0.2 | +10, +10 |
| Tergitol 4 | 1.9 | Indefinite, +0.2 | +14, +3 |
| Teepol | 1.9 | +0.6, 0 | +14, +6 |
| Surfax WO | 1.9 | +0.6, 0 | −6, 0 |
| Ultrawet K | 1.6 | +1, 0 | +8, +1 |
| Arctic Syntex A | 2.0 | 0, 0 | +10, 0 |
| Igepon CN-42 | 2.0 | 0, +0.6 | +7, +8 |
| Darvan #1 | 1.9 | −1 | +10 |
| Arctic Syntex M | 1.75 | 0 | +6 |

It is to be understood that in the preceding examples the active agents used are bound to the protein, and that the true protein content of the product is reduced slightly, while the total dry weight yield of product is increased slightly. In making comparisons with a blank, however, equal weights of dry product were taken, disregarding the small differences in actual protein content.

Having thus disclosed our invention, we claim:

In a method for isolating, from soybean material, a substantially unhydrolyzed protein characterized by improved adhesive strength in paper coating applications, which comprises treating substantially oil-free protein-containing soybean material with a protein extracting medium at a pH in the range from about 6.3 to about 10.5 at a temperature in the range from about 70° to 120° F. to extract the protein in a substantially unhydrolyzed condition, separating the solution from the residue, reducing the pH of the solution to the isoelectric point of the protein to precipitate the protein therefrom, washing the precipitated protein, filtering the washed protein, and granulating and drying the protein filter cake, the step which comprises adding to the proteinaceous material, prior to filtration, in an amount from about 1% to 4.5% by weight of the protein, an anionic surface-active agent containing from 6 to 22 carbon atoms and a polar anionic group containing sulfur in its highest state of oxidation.

References Cited in the file of this patent

UNITED STATES PATENTS

| | | |
|---|---|---|
| 2,309,113 | Huppert | Jan. 26, 1943 |
| 2,312,056 | White | Feb. 23, 1943 |
| 2,392,302 | Baker et al. | Jan. 8, 1946 |
| 2,403,251 | Watson | July 2, 1946 |
| 2,462,811 | Konen et al. | Feb. 22, 1949 |
| 2,484,878 | Eberl | Oct. 18, 1949 |
| 2,666,049 | Rowe | Jan. 12, 1954 |
| 2,810,656 | McDowell | Oct. 22, 1957 |

FOREIGN PATENTS

| | | |
|---|---|---|
| 482,188 | Canada | Apr. 1, 1952 |